(12) United States Patent
Hsiao et al.

(10) Patent No.: US 10,194,387 B2
(45) Date of Patent: Jan. 29, 2019

(54) COORDINATOR AND CONTROL METHOD THEREOF, WIRELESS SENSING NETWORK COMMUNICATION SYSTEM AND METHOD

(71) Applicant: NANNING FUGUI PRECISION INDUSTRIAL CO., LTD., Nanning (CN)

(72) Inventors: Chung-Yu Hsiao, New Taipei (TW); Chun-Fei Huang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/391,845

(22) Filed: Dec. 28, 2016

(65) Prior Publication Data

US 2018/0184368 A1   Jun. 28, 2018

(51) Int. Cl.
*H04W 4/00* (2018.01)
*H04W 52/02* (2009.01)
(Continued)

(52) U.S. Cl.
CPC ..... *H04W 52/0203* (2013.01); *H04L 12/2803* (2013.01); *H04W 24/10* (2013.01); *H04W 48/18* (2013.01); *H04W 84/18* (2013.01)

(58) Field of Classification Search
CPC ......... H04W 4/06; H04W 4/18; H04W 24/10; H04W 48/18; H04W 52/02;
(Continued)

(56) References Cited

U.S. PATENT DOCUMENTS 8,238,308 B2 *  8/2012  Jeon ................... H04W 36/12
                                                    370/331
8,399,377 B2 *  3/2013  Miki ...................... B41M 5/44
                                                    503/227
(Continued)

FOREIGN PATENT DOCUMENTS

CN    103533702    1/2014
CN    105471648    4/2016

OTHER PUBLICATIONS

Dong, Dual Coordinator Structure for Zigbee Network, Trans Tech Publications, 5 pages, 2013.*

*Primary Examiner* — Frank Duong
(74) *Attorney, Agent, or Firm* — ScienBiziP, P.C.

(57) ABSTRACT

A primary coordinator in a smart home system communicates with a plurality of sensors and receives commands from a control device. Battery life in each sensor is extended by suspending sensor searches for data reporting purposes. The coordinator includes calculation module, determination module, execution module, and searching module. The control device can setup one sensor as deputy coordinator if primary coordinator is unavailable. The calculation module receives function commands and calculates period of completion time (execution time). The determination module determines whether the execution time is greater than a first predetermined time and the execution module can inform the function to the sensors or the deputy coordinator, and executes the function. A coordinator control method and a wireless sensing network communication system and method are further provided.

22 Claims, 5 Drawing Sheets

(51) Int. Cl.
*H04W 24/10* (2009.01)
*H04W 48/18* (2009.01)
*H04L 12/28* (2006.01)
*H04W 84/18* (2009.01)

(58) Field of Classification Search
CPC . H04W 52/0203; H04W 72/04; H04W 74/08; H04W 80/04; H04W 84/12; H04W 84/18; H04W 88/06; H04W 88/08; H04L 12/2803; H04L 2012/5608
See application file for complete search history.

(56) References Cited

U.S. PATENT DOCUMENTS

| | | | | |
|---|---|---|---|---|
| 8,457,013 | B2* | 6/2013 | Essinger | H04W 4/50 370/254 |
| 2014/0204727 | A1* | 7/2014 | Gu | H04W 12/04 370/217 |
| 2017/0163521 | A1 | 6/2017 | Hu | |

* cited by examiner

COORDINATOR AND CONTROL METHOD THEREOF, WIRELESS SENSING NETWORK COMMUNICATION SYSTEM AND METHOD

FIELD

The subject matter herein generally relates to a coordinator, a coordinator control method, and a wireless sensing network communication system and method.

BACKGROUND

In smart home technology, all home devices in a house are connected to a smart home network system, so as to allow a user to easily control the home devices. The smart home network system includes a plurality of sensors, and each of the sensors can be battery powered. It is problematic for the smart home network system to reduce power consumption of the sensors.

BRIEF DESCRIPTION OF THE DRAWINGS

Implementations of the present technology will now be described, by way of example only, with reference to the attached figures.

DETAILED DESCRIPTION

Figure 1:
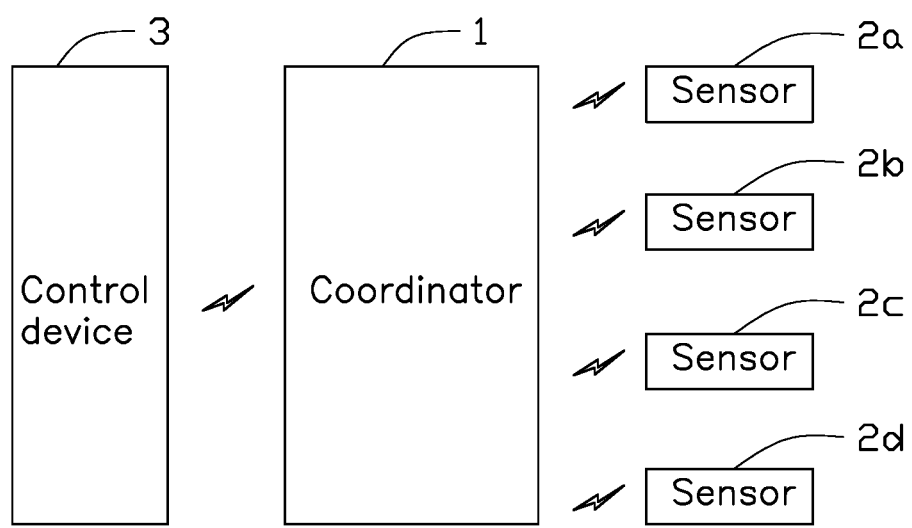
FIG. 1 is a diagram of an exemplary embodiment of a coordinator of a smart home system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure. It should be noted that references to "an" or "one" exemplary embodiment in this disclosure are not necessarily to the same exemplary embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a smart home system. The smart home system comprises a coordinator 1, a control device 3 and a plurality of sensors.

In one exemplary embodiment, the sensors can be smart home sensors. For example, the sensors can be a door sensor, a light sensor, a motion sensor, an air sensor, or a temperature sensor. Each of the sensors can be supplied with power by a battery or an adaptor. The plurality of sensors in this exemplary embodiment comprises four sensors 2a to 2d.

In one exemplary embodiment, the coordinator 1 can communicate with the control device 3 and the sensors 2a to 2d through a wireless communication. The wireless communication can be ZIGBEE technology for example, but is not limited by the exemplary embodiments herein.

The coordinator 1 is configured to receive and process information sensed by the sensors 2a to 2d. The coordinator 1 is further configured to receive a command from the control device 3.

In one exemplary embodiment, the coordinator 1 can be a gateway. The control device 3 can be a mobile phone, a computer, or a smart watch. The command can be transmitted from the mobile phone. The coordinator 1 can manage the sensors 2a to 2d according to the command.

In one exemplary embodiment, the sensor 2a comprises two operation modes. The two operation modes are sensor mode and coordinator mode. A software module that has partial functions complying with ZIGBEE standards can be added to the sensor 2a. The sensors 2b to 2d comprise one operation mode (sensor mode).

When the sensor 2a is in the sensor mode, the sensor 2a is a common sensor, and the sensor 2a provides data as electrical signal. When the sensor 2a in the coordinator mode, the sensor 2a can act as an alternative coordinator. The sensor 2a can thus replace the coordinator 1 to receive and process data from the sensors 2b to 2d.

Figure 2:
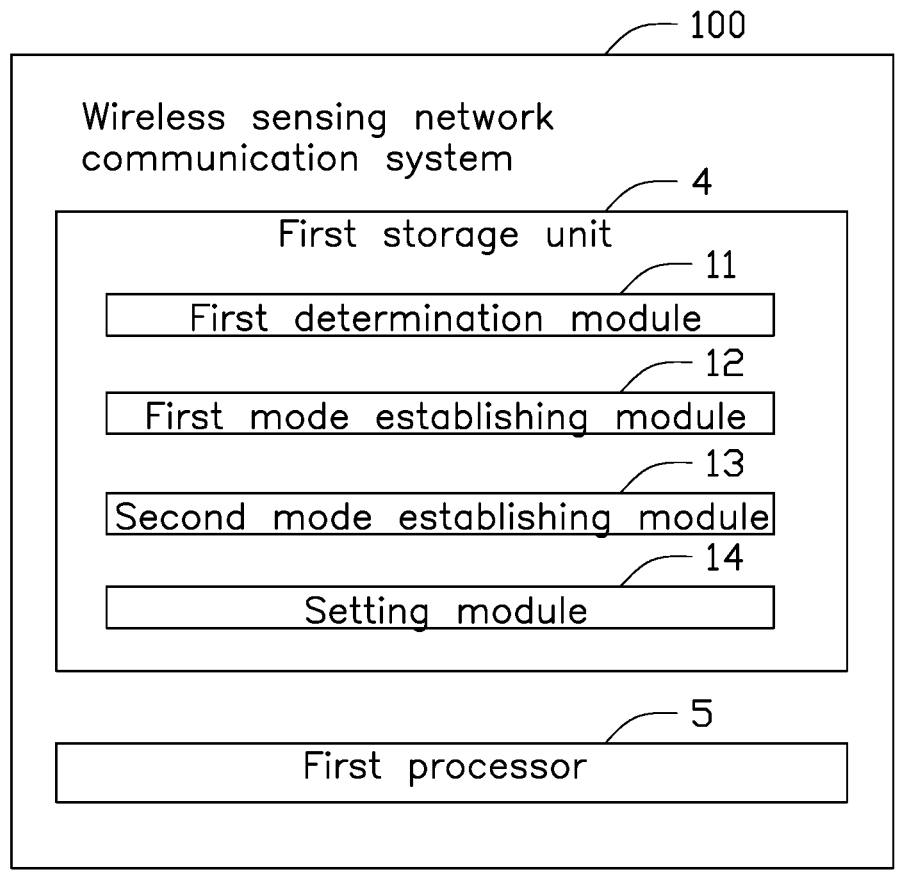
FIG. 2 is a block diagram of an exemplary embodiment of a wireless sensing network communication system.

FIG. 2 illustrates a wireless sensing network communication system 100. The wireless sensing network communication system 100 can comprise at least one first storage unit 4 and at least one first processor 5. The wireless sensing network communication system 100 can further include a plurality of modules, such as a first determination module 11, a first mode establishing module 12, a second mode establishing module 13, and a setting module 14. The modules 11-14 can include one or more software programs in the form of computerized codes stored in the first storage unit 4. The computerized codes can include instructions that can be executed by the first processor 5 to provide functions for the modules 11-14.

The first determination module 11 can detect the coordinator 1. When the coordinator 1 is detected by the first determination module 11, the first mode establishing module 12 is configured to control the sensors 2a to 2d to transmit access requests to the coordinator 1. The second mode establishing module 13 is configured to control the sensor 2a to switch to the coordinator mode, as an alternative coordinator, and control the sensors 2b to 2d to transmit access requests to the sensor 2a, in response to the coordinator 1 being not detected. For example, When the coordinator 1 is in an abnormal state, the coordinator 1 is under maintenance, or the coordinator 1 is in a system update state, the first determination module 11 cannot detect the coordinator 1, the sensor 2a can temporarily act as the alternate coordinator in place of the unavailable coordinator 1.

When the coordinator 1 disconnects communication with the sensors 2b to 2d, the sensors 2b to 2d may repeatedly search for the coordinator 1, and the battery of each of the sensors 2b to 2d is quickly reduced. When the sensor 2a is switched to be the alternative coordinator, the sensors 2b to 2d can access the alternative coordinator, and the sensors 2b to 2d will stop searching for the coordinator 1. Battery consumption of each of the sensors 2b to 2d is thus reduced.

In one exemplary embodiment, the first determination module 11 is further configured to determine whether the sensors 2a to 2d can access the coordinator 1. When the sensors 2a to 2d can access the coordinator 1, the sensors 2a to 2d will communicate with the coordinator 1.

When the sensor 2a cannot access the coordinator 1, the second mode establishing module 13 is further configured to control the sensor 2a to switch to being the alternative coordinator. When the sensor 2b cannot access the coordinator 1, the first determining module 11 is further configured to determine whether an alternative coordinator is detected. When the first determining module 11 cannot detect the alternative coordinator, the setting module 14 is configured to set the sensor 2b to redetect the coordinator 1 after a predetermined time.

When the first determining module 11 detects the alternative coordinator (the sensor 2a in coordinator mode), the second mode establishing module 13 is further configured to control the sensor 2b to transmit access request to the alternative coordinator. When the sensor 2b can access the alternative coordinator, the sensor 2b can communicate with and send data to the alternative coordinator. When the sensor 2b cannot access the alternative coordinator, the setting module 14 is further configured to set the sensor 2b to redetect coordinator 1 after the predetermined time.

In one exemplary embodiment, the predetermined time can be five minutes. Descriptions and configurations of the sensors 2c and 2d being unable to access the coordinator 1 are omitted, these being substantially the same as for those of the sensor 2b.

In one exemplary embodiment, when the coordinator 1 resumes operations and is detected by the first determining module 11, the second mode establishing module 13 is further configured to control the sensor 2a to switch from the coordinator mode to the sensor mode. The sensor 2a is controlled to disconnect from the sensors 2b to 2d. Thereby, the sensors 2a to 2d transmit future access requests to the coordinator 1.

Figure 3:
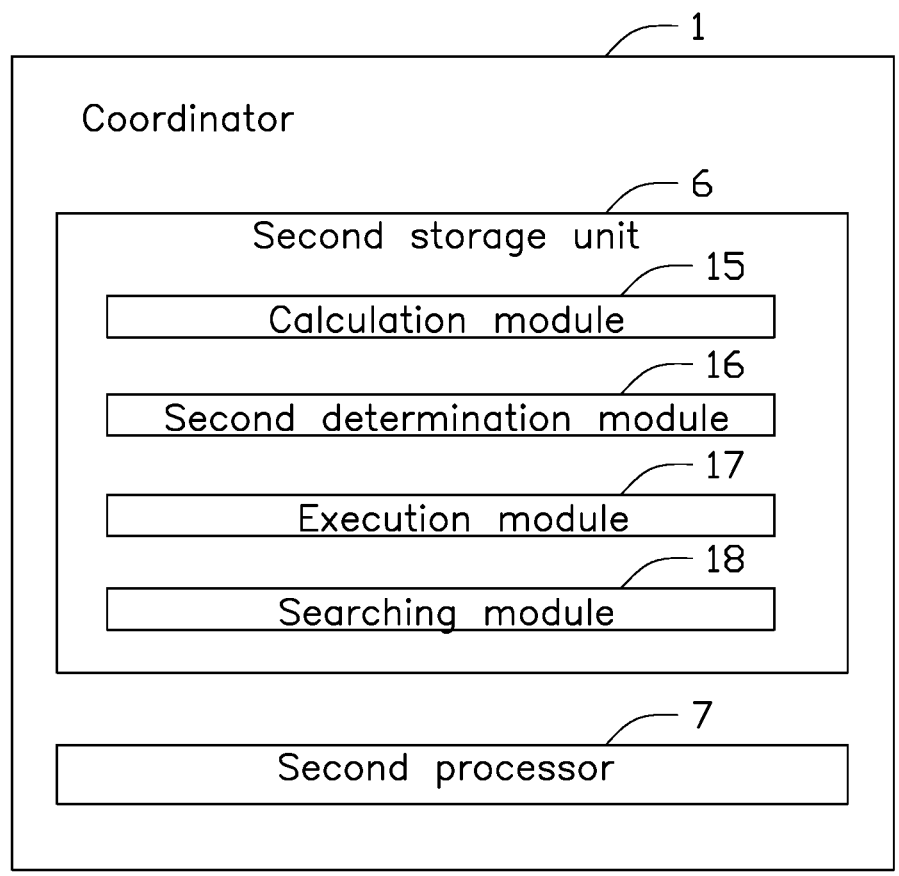
FIG. 3 is a block diagram of an exemplary embodiment of a coordinator in a smart home system.

Referring to FIG. 3, the coordinator 1 can comprise at least one second storage unit 6 and at least one second processor 7. The coordinator 1 can further include a plurality of modules, such as a calculation module 15, a second determination module 16, an execution module 17, and a searching module 18. The modules 15-18 can include one or more software programs in the form of computerized codes stored in the second storage unit 6. The computerized codes can include instructions that can be executed by the second processor 7 to provide functions for the modules 15-18.

The calculation module 15 is configured to receive an execution command of an event and calculates a period of time for execution of the event. The execution command can be transmitted by the control device 3. The period of time for execution is the length of time that the coordinator 1 requires to execute and complete the event.

In one exemplary embodiment, when the coordinator 1 is executing the event, the coordinator 1 will disconnect from the sensors 2a to 2d. The event can be a software update or a system update for example. The sensors 2a to 2d are set to update and report the data they have sensed in cycles. Each cycle can be about 10 minutes, but is not limited to the exemplary embodiment herein. The time of each cycle is a cycle time in the instant disclosure.

The second determination module 16 is configured to determine whether the period of time for executing the event (execution time) is greater than a first predetermined time. The first predetermined time can be set according to the cycle times of the sensors 2a to 2d.

When the execution time is less than the first predetermined time, the sensors 2a to 2d do not repeatedly search for the coordinator 1. The execution module 17 is configured to inform an event to each of sensors 2a to 2d and the execution module 17 executes the event as commanded.

For example, the coordinator 1 may receive a system update command and calculate that the system updating needs 5 minutes. The event is the system update and the execution time of the system updating is 5 minutes. The first predetermined time can be 10 minutes. The execution time of the system update (5 minutes) is less than the first predetermined time (10 minutes), thus the execution module 17 informs the system update to each of the sensors 2a to 2d. After the execution module 17 informs, the execution module 17 executes the system update as commanded. Each of the sensors 2a to 2d disconnects from the coordinator 1 for a period of 5 minutes. The sensors 2a to 2d do not search for the coordinator 1 within the period of 5 minutes.

In one exemplary embodiment, the second determination module 16 is further configured to determine whether each of the sensors 2a to 2d receives an event notification. When each of the sensors 2a to 2d receives the event notification, the execution module 17 executes the event according to the execution command. For example, when each of the sensors 2a to 2d receives the system update notification, the execution module 17 executes the system update. If the sensor 2a does not receive the system update notification, the second determination module 16 is further configured to determine whether a notification time is greater than a second predetermined time. When the notification time is greater than the second predetermined time, the execution module 17 executes the event as commanded.

In one exemplary embodiment, the notification time is the length of time that the execution module 17 took to inform the sensors 2a to 2d.

In one exemplary embodiment, the second predetermined time can be 30 seconds, and is not limited to the exemplary embodiment herein. When the notification time is greater than 30 seconds, the execution module 17 executes the event as commanded.

In one exemplary embodiment, if the execution time is greater than the first predetermined time and the alternative coordinator exists, the coordinator 1 informs the event to the alternative coordinator rather than informing the sensors 2a to 2d.

The searching module 18 is configured to search for the alternative coordinator (the sensor 2a in coordinator mode). When the execution time is greater than the first predetermined time and the alternative coordinator is searched for by the searching module 18, the execution module 17 informs the alternative coordinator about the event. After the execution module 17 informs, the execution module 17 executes the event as commanded.

In one exemplary embodiment, the second determination module 16 is further configured to determine whether the alternative coordinator receives the event notification. When the alternative coordinator receives the event notification, the execution module 17 executes the event as commanded. When the alternative coordinator does not receive the event notification, the second determination module 16 is further configured to determine whether the notification time is greater than a fourth predetermined time. When the notification time is greater than the fourth predetermined time, the execution module 17 executes the event as commanded.

In one exemplary embodiment, the fourth predetermined time can be 35 seconds, and is not limited to the exemplary embodiment herein. When the notification time is greater than 35 seconds, the execution module 17 executes the event as commanded.

For example, the coordinator 1 receives a software update command and calculates that the software update will require 15 minutes. The execution time of the software update (15 minutes) is greater than the first predetermined time (10 minutes), thus the execution module 17 informs the software update to the alternative coordinator. After the execution module 17 informs, the execution module 17 executes the software update according to the software update command.

In one exemplary embodiment, when the searching module 18 does not search for an alternative coordinator and the execution time is greater than the first predetermined time, the second determination module 16 is further configured to determine whether the execution time is greater than a period of time for feedback (feedback time) from the sensors 2a to 2d.

In one exemplary embodiment, when the searching module 18 does not search for an alternative coordinator, this indicates that the sensor 2a is in the sensor mode or that the sensor 2a is not operating normally.

In one exemplary embodiment, the sensors 2a to 2d have the same cycle times and the same feedback times, and the feedback times are less than the cycle times. When the feedback time is 2 minutes, this means that the sensors 2a to 2d report the sensed data to the coordinator 1 or to the alternative coordinator after 2 minutes. After the sensors 2a to 2d report the sensed data, a next reporting time of the sensors 2a to 2d is according to the cycle times.

When the execution time is less than the feedback time, the execution module 17 executes the event as commanded. When the execution time is greater than the feedback time, the execution module 17 is further configured to await the receiving of reports from the sensors 2a to 2d. After the execution module 17 receives the reports (sensed data) of the sensors 2a to 2d, the execution module 17 executes the event as commanded. When a waiting time of the execution module 17 awaiting reports is greater than a third predetermined time, the execution module 17 executes the event as commanded.

In one exemplary embodiment, the third predetermined time is greater than the feedback time. For example, when the feedback time is 2 minutes, the third predetermined time can be 3 minutes, and are not limited to the exemplary embodiment herein.

Figure 4:
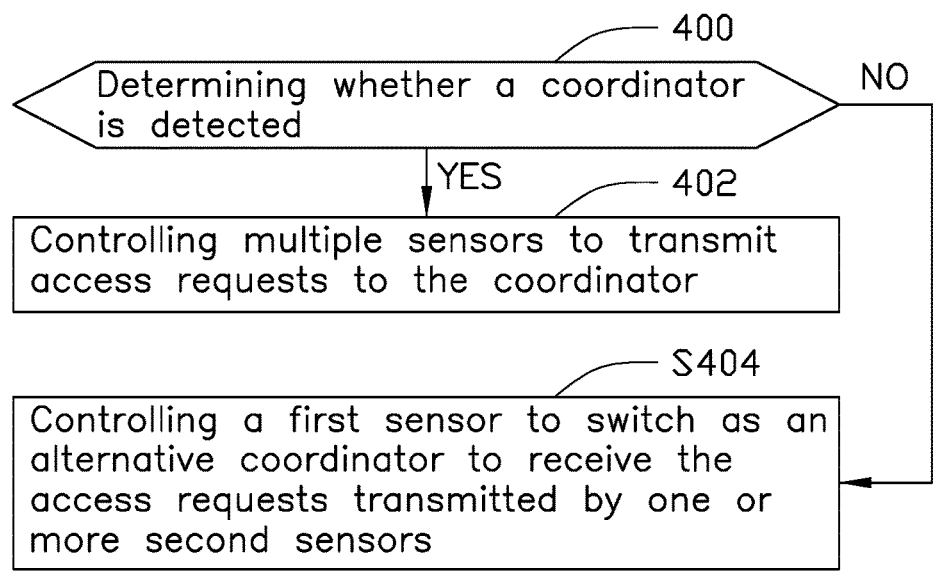
FIG. 4 is a flow diagram of an exemplary embodiment of a wireless sensing network communication method.

FIG. 4 illustrates an exemplary embodiment of a wireless sensing network communication method. The flowchart presents an example exemplary embodiment of the method. The example method is provided by way of example, as there are a variety of ways to carry out the method. The method described below can be carried out using the configurations illustrated in FIG. 2, for example, and various elements of these figures are referenced in explaining the example method. Each step shown in FIG. 4 represents one or more processes, methods, or subroutines, carried out in the example method. Furthermore, the illustrated order of steps is illustrative only and the order of the steps can change. Additional steps can be added or fewer steps may be utilized without departing from this disclosure. The example method can begin at step S400.

In step S400, the first determining module 11 determines whether the coordinator 1 is detected.

In step S402, the first mode establishing module 12 controls the sensors 2a to 2d to transmit the access requests to the coordinator 1 in response to the coordinator 1 being detected.

In step S404, the second mode establishing module 13 controls the sensor 2a to switch as the alternative coordinator and controls the sensors 2b to 2d to transmit the access requests to the alternative coordinator in response to the coordinator 1 being not detected.

In one exemplary embodiment, the first determination module 11 is further configured to determine whether the sensors 2a to 2d access the coordinator 1. When the sensors 2a to 2d access the coordinator 1, the sensors 2a to 2d communicate with the coordinator 1. When the sensor 2a cannot access the coordinator 1, the second mode establishing module 13 further controls the sensor 2a to switch as the alternative coordinator. When the sensor 2b cannot access the coordinator 1, the first determining module 11 further determines whether the alternative coordinator is detected. When the first determining module 11 does not detect the alternative coordinator, the setting module 14 sets the sensor 2b to redetect the coordinator 1 after the predetermined time.

When the first determining module 11 detects the alternative coordinator, the second mode establishing module 13 further controls the sensor 2b to transmit the access request to the alternative coordinator. When the sensor 2b access the alternative coordinator, the sensor 2b communicates with the alternative coordinator. When the sensor 2b cannot access to the alternative coordinator, the setting module 14 sets the sensor 2b to redetect the coordinator 1 after the predetermined time.

In one exemplary embodiment, when the coordinator 1 resumes operations and is detected by the first determining module 11, the second mode establishing module 13 further controls the sensor 2a to switch from the coordinator mode to the sensor mode. The sensor 2a disconnects communication from the sensors 2b to 2d. Thereby, the sensors 2a to 2d transmit future access requests to the coordinator 1.

Figure 5:
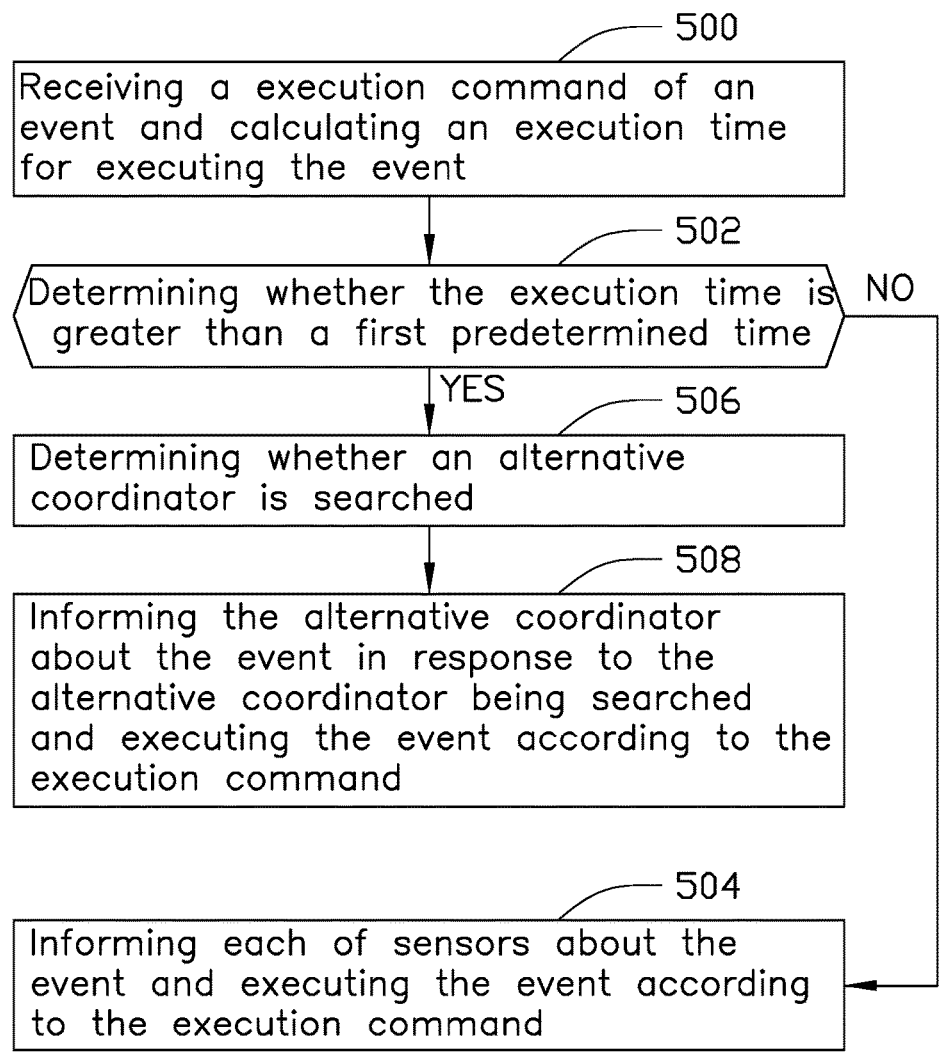
FIG. 5 is a flow diagram of an exemplary embodiment of a coordinator control method in a smart home system.

FIG. 5 illustrates an exemplary embodiment of a coordinator control method. The flowchart presents an example exemplary embodiment of the method. The example method is provided by way of example, as there are a variety of ways to carry out the method. The method described below can be carried out using the configurations illustrated in FIG. 3, for example, and various elements of these figures are referenced in explaining the example method. Each step shown in FIG. 5 represents one or more processes, methods, or subroutines, carried out in the example method. Furthermore, the illustrated order of steps is illustrative only and the order of the steps can change. Additional steps can be added or fewer steps may be utilized without departing from this disclosure. The example method can begin at step S500.

In step S500, the calculation module 15 receives a execution command of a event and calculates a execution time for executing the event.

In step S502, the second determination module 16 determines whether the execution time is greater than the first predetermined time.

In step S504, the execution module 17 informs each of the sensors 2a to 2d about the event and executes the event according to the execution command in response to the execution time being less than the first predetermined time.

In step S506, if the execution time is greater than the first predetermined time, the searching module 18 determines whether an alternative coordinator is searched in response to the execution time being greater than the first predetermined time.

In step S508, the execution module 17 informs the alternative coordinator about the event and executes the event according to the execution command in response to the alternative coordinator being searched.

In one exemplary embodiment, the second determination module 16 further determines whether each of the sensors 2a to 2d receives the event notification. When each of the sensors 2a to 2d receives the event notification, the execution module 17 executes the event according to the execution command. When one or more sensor do(es) not receive the event notification, the second determination module 16 further determines whether the notification time is greater than the second predetermined time. When the notification time is greater than the second predetermined time, the execution module 17 executes the event according to the execution command.

In one exemplary embodiment, when the execution time is greater than the first predetermined time and the alternative coordinator is searched by the searching module 18, the second determination module 16 further determines whether the alternative coordinator receives the event notification. When the alternative coordinator receives the event notification, the execution module 17 executes the event according to the execution command. When the alternative coordinator does not receive the event notification, the second determination module 16 further determines whether the notification time is greater than the fourth predetermined time. When the notification time is greater than the fourth predetermined time, the execution module 17 executes the event according to the execution command.

In one exemplary embodiment, when the searching module 18 cannot search the alternative coordinator and the execution time is greater than the first predetermined time, the second determination module 16 further determines whether the execution time is greater than the feedback time of the sensors 2a to 2d.

When the execution time is less than the feedback time, the execution module 17 executes the event according to the execution command. When the execution time is greater than the feedback time, the execution module 17 further awaits the receiving of the reports from the sensors 2a to 2d. After the execution module 17 receives the reports, the execution module 17 executes the event according to the execution command. When a waiting time for awaiting the reposts is greater than the third predetermined time, the execution module 17 executes the event according to the execution command.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A wireless sensing network communication method operable to be executed in a communication system, comprising:
    determining whether a coordinator is detected;
    controlling multiple sensors to transmit access requests to the coordinator to keep the multiple sensors providing data as normal, in response to the coordinator being detected; and
    controlling a first sensor to switch to be an alternative coordinator to receive the access requests transmitted by one or more second sensors to keep the second sensors providing data as normal, in response to the coordinator being not detected;
    wherein when the first sensor is switched to be the alternative coordinator, the second sensors accesses the alternative coordinator, and the second sensors stop searching for the coordinator;
    wherein the multiple sensors comprise the first sensor and the one or more second sensors.

2. The wireless sensing network communication method of claim 1, further comprising:
    determining whether the sensor accesses the coordinator;
    controlling the sensor to communicate with the coordinator in response to the sensor accessing the coordinator;
    controlling the sensor to switch to the alternative coordinator in response to the sensor being the first sensor and the sensor not accessing the coordinator; and
    setting the sensor to detect the coordinator after a predetermined time in response to the sensor being the second sensor and the sensor not accessing the coordinator.

3. The wireless sensing network communication method of claim 2, wherein setting the sensor to detect the coordinator after a predetermined time in response to the sensor being the second sensor and the sensor not accessing the coordinator comprises:
    determining whether the alternative coordinator being detected in response to the sensor being the second sensor and the sensor not accessing the coordinator;
    controlling the second sensor to transmit the access request to the alternative coordinator in response to the alternative coordinator being detected; and
    determining whether the second sensor accesses the alternative coordinator;
    controlling the second sensor to communicate with the alternative coordinator in response to the second sensor accessing the alternative coordinator; and
    setting the second sensor to detect the coordinator after the predetermined time in response to the second sensor not accessing the alternative coordinator.

4. The wireless sensing network communication method of claim 1, wherein controlling a first sensor to switch to be an alternative coordinator to receive the access requests transmitted by one or more second sensors in response to the coordinator being not detected comprises:
    controlling a first sensor to switch to be an alternative coordinator to replace the coordinator and to communicate with one or more second sensors in response to the coordinator being not detected; and
    controlling the first sensor to switch as a sensor mode and disconnecting communication with the one or more second sensors in response to the coordinator being detected again.

5. The wireless sensing network communication method of claim 1, further comprising:

determining whether the second sensor accesses the alternative coordinator;
controlling the second sensor to communicate with the alternative coordinator in response to the second sensor accessing the alternative coordinator; and
setting the second sensor to detect the coordinator after a predetermined time in response to the second sensor not accessing the alternative coordinator.

6. The wireless sensing network communication method of claim 1, wherein the first sensor is added with software programs that has partial functions complying with communication standards.

7. A wireless sensing network communication system comprising:
at least one processor;
a non-transitory storage system coupled to the at least one processor and configured to store one or more programs configured to be executed by the at least one processor, the one or more programs comprising instructions for:
determining whether a coordinator is detected;
controlling multiple sensors to transmit access requests to the coordinator to keep the multiple sensors providing data as normal, in response to the coordinator being detected; and
controlling a first sensor to switch to be an alternative coordinator and control one or more second sensors to transmit the access requests to the alternative coordinator to keep the second sensors providing data as normal, in response to the coordinator being not detected;
wherein when the first sensor is switched to be the alternative coordinator, the second sensors accesses the alternative coordinator, and the second sensors stop searching for the coordinator;
wherein the multiple sensors comprise the first sensor and the one or more second sensors.

8. The wireless sensing network communication system of claim 7, further comprising instructions for;
determining whether the sensor accesses the coordinator;
controlling the sensor to communicate with the coordinator in response to the sensor accessing the coordinator;
controlling the sensor to switch as the alternative coordinator in response to the sensor being the first sensor and the sensor not accessing the coordinator; and
setting the sensor to detect the coordinator after a predetermined time in response to the sensor being the second sensor and the sensor not accessing the coordinator.

9. The wireless sensing network communication system of claim 8, further comprising instructions for:
determining whether the alternative coordinator is detected in response to the sensor being the second sensor and the second sensor not accessing the coordinator;
controlling the second sensor to transmit the access request to the alternative coordinator in response to the alternative coordinator being detected;
determining whether the second sensor accesses the alternative coordinator;
controlling the second sensor communicates with the alternative coordinator in response to the second sensor accessing the alternative coordinator; and
setting the second sensor to detect the coordinator after the predetermined time in response to the second sensor not accessing the alternative coordinator.

10. The wireless sensing network communication system of claim 7, further comprising:
determining whether the second sensor accesses the alternative coordinator, and controlling the second sensor communicates with the alternative coordinator in response to the second sensor accessing the alternative coordinator; and
setting the second sensor to detect the coordinator after a predetermined time in response to the second sensor not accessing the alternative coordinator.

11. The wireless sensing network communication system of claim 7, wherein the first sensor is added with software programs that has partial functions complying with communication standards.

12. The wireless sensing network communication system of claim 7, wherein further comprising: controlling a first sensor to switch to be an alternative coordinator to replace the coordinator and to communicate with one or more second sensors in response to the coordinator being not detected; and controlling the first sensor to switch as a sensor mode and disconnect communication with the one or more second sensors in response to the coordinator being detected again.

13. A coordinator control method operable to be executed in a coordinator, comprising:
receiving an execution command of an event and calculating an execution time for executing the event, wherein the event comprises at least a software update or a system update;
determining whether the execution time is greater than a first predetermined time;
informing each of sensors about the event in response to the execution time less than the first predetermined time and executing the event according to the execution command;
determining whether an alternative coordinator is searched in response to the execution time being greater than the first predetermined time;
informing the alternative coordinator about the event in response to the alternative coordinator being searched and executing the event according to the execution command.

14. The coordinator control method of claim 13, wherein informing each of sensors about the event and executing the event according to the execution command comprises:
informing each of sensors about the event;
determining whether each of the sensors receives event notification;
executing the event according to the execution command in response to each of the sensors receiving the event notification;
determining whether a notification time is greater than a second predetermined time in response to one or more sensors not receiving the event notification; and
executing the event according to the execution command in response to the notification time being greater than the second predetermined time.

15. The coordinator control method of claim 13, wherein informing the alternative coordinator about the event in response to the alternative coordinator being searched and executing the event according to the execution command comprises:
informing the alternative coordinator about the event;
determining whether the alternative coordinator receives event notification;

executing the event according to the execution command in response to the alternative coordinator receiving the event notification;

determining whether a notification time is greater than a fourth predetermined time in response to the alternative coordinator not receiving the event notification; and executing the event according to the execution command in response to the notification time being greater than the fourth predetermined time.

16. The coordinator control method of claim 13, further comprising:

determining whether the execution time is greater than a feedback time of the sensors in response to the alternative coordinator being not searched;

executing the event according to the execution command in response to the execution time less than the feedback time; and determining whether reports of the sensor are received in response to the execution time being greater than the feedback time; and executing the event according to the execution command in response to the reports of the sensor being received.

17. The coordinator control method of claim 16, further comprising:

determining whether a waiting time for awaiting the reports is greater than a third predetermined time in response to the reports being not received; and executing the event according to the execution command in response to the waiting time being greater than the third predetermined time;

wherein the third predetermined time is greater than the feedback time.

18. A coordinator comprising:

at least one processor;

a non-transitory storage system coupled to the at least one processor and configured to store one or more programs configured to be executed by the at least one processor, the one or more programs comprising instructions for:

receiving an execution command of an event and calculates an execution time for executing the event, wherein the event comprises at least a software update or a system update;

determining whether the execution time is greater than a first predetermined time;

informing each of sensors about the event in response to the execution time less than the first predetermined time and executing the event according to the execution command; and searching for an alternative coordinator;

informing the alternative coordinator about the event in response to the execution time being greater than the first predetermined time and execute the event according to the execution command.

19. The coordinator of claim 18, further comprising instructions for: determining whether each of the sensors receives event notification; executing the event according to the execution command in response to each of the sensors receiving the event notification;

when one or more sensors do not receive the event notification, determining whether a notification time is greater than a second predetermined time; and executing the event according to the execution command in response to the notification time being greater than the second predetermined time.

20. The coordinator of claim 18, wherein the coordinator further comprises instructions for: determining whether the alternative coordinator receives event notification; executing the event according to the execution command in response to the alternative coordinator receiving the event notification;

when the alternative coordinator does not receive the event notification, determining whether a notification time is greater than a fourth predetermined time; and executing the event according to the execution command in response to the notification time being greater than the fourth predetermined time.

21. The coordinator of claim 18, wherein when the alternative coordinator is not searched and the execution time being greater than the first predetermined time, determining whether the execution time is greater than a feedback time of the sensors;

executing the event according to the execution command in response to the execution time less than the feedback time; and executing the event according to the execution command after receives reports from the sensors in response to the execution time being greater than the feedback time.

22. The coordinator of claim 21, wherein when the execution time is greater than the feedback time and a waiting time for awaiting the reports is greater than a third predetermined time, further comprising instructions for: executing the event according to the execution command wherein the third predetermined time is greater than the feedback time.

* * * * *